Patented Oct. 10, 1950

2,525,521

UNITED STATES PATENT OFFICE 2,525,521

COPOLYMERS OF ACRYLONITRILE AND 2-METHALLYL ALCOHOL

John R. Caldwell, Kingsport, Tenn., assignor to Eastman Kodak Company, Rochester, N. Y., a corporation of New Jersey No Drawing. Application March 23, 1948, Serial No. 16,623

10 Claims. (Cl. 260—85.5)

1

This invention relates to copolymers of acrylonitrile and 2-methallyl alcohol.

Polyacrylonitrile and copolymers of acrylonitrile with other polymerizable substances, for example vinyl or acrylic compounds, in which at least 85% by weight of the polymer is acrylonitrile have been known for some time and recognized as possessing desirable physical and chemical properties, including toughness and insolubility in, and insensitivity to, common organic solvents, such as methyl or ethyl alcohol, acetone, ethyl ether, ethyl acetate, hydrocarbon solvents, chlorinated hydrocarbon, etc.

Various efforts have been made to form these polymeric materials into threads, films and other shaped articles. These efforts have been greatly hindered by the extreme insolubility of the polymeric materials in the ordinary solvents set forth above.

H. Rein, United States Patent 2,140,921, dated December 20, 1938, showed that concentrated aqueous solutions of inorganic salts, e. g. lithium bromide, zinc chloride and sodium sulfocyanide, would dissolve polyacrylonitrile and it has been proposed to employ the resulting solutions in the formation of yarns and films. However, it has been found substantially impossible to use the resulting compositions for such a purpose. Their extrusion into coagulating baths, such as water, dilute acid, dilute salt solutions, etc., results in the formation of shaped articles that contain large amounts of inorganic salts. These salts are distributed throughout the structure and destroy the continuity of the polyacrylonitrile phase and the structure possesses poor physical properties. Removal of these salts, when possible, results in formation of a porous, spongy, weak, undesirable structure which is brittle and unsuited for use as film or for the spinning of yarn.

C. Tobis, United States Patent 2,167,537, dated July 25, 1939, points out that certain copolymers of acrylonitrile and an acrylic acid ester (those containing not more than 65% of acrylonitrile) are soluble in a mixture of dioxane, monochlorobenzene cyclohexanone, dichloroethyl ether and ethylene glycol diacetate. However, such copolymers containing up to only 65% of acrylonitrile are not possessed of the especially desirable properties of polyacrylonitrile and of copolymers containing at least 85% by weight of acrylonitrile.

It has also been proposed by H. Rein, United States Patent 2,117,210, dated May 10, 1938, to dissolve polyacrylonitrile in molten quaternary ammonium salts, e. g. pyridine benzyl chloride, an ionizable salt. Such solutions are not satis-

2 factory for the production of commercially useful shaped articles of polyacrylonitrile. Films or filaments made from such solutions are extremely brittle, highly colored and very weak, probably because of the presence of residual quaternary salt. Removal of the salt is difficult and results in articles substantially useless for commercial purposes.

More recently, G. H. Latham (United States Patent 2,404,714, dated July 23, 1946) has proposed to dissolve polymers of acrylonitrile containing in the polymer molecule at least 85% by weight of acrylonitrile in a dimethyl carbonyl compound such as N,N - dimethylformamide, N,N,N'N'-$\alpha$-pentamethyl - $\alpha$ - cyanosuccinamide, N N,N',N'-tetramethylglutaramide, etc. From solutions in these compounds the polymers of acrylonitrile can be extruded through a spinneret into a tubular cell, the solvent evaporated and the monofilament spun to a yarn. However, since the aforesaid solvents have high boiling points, high temperatures are required to evaporate the solvent, e. g. 400° C. Such high temperatures are clearly undesirable.

I have now found that acrylonitrile and 2-methallyl alcohol can be copolymerized and that the resulting copolymer, even when containing as much as 85% by weight of acrylonitrile, is soluble in readily volatile solvents, such as acetone and acetonitrile. This is surprising, since the prior art shows that polymers containing as much as 85% of acrylonitrile are soluble in only such high boiling solvents as dimethylformamide, ethylene cyanohydrin, etc. Solutions of many of my new copolymers can, therefore, readily be spun to give high quality yarn by a dry spinning method. It is accordingly an object of my invention to provide new copolymers. A further object is to provide a new copolymer from which high quality yarn can be made. A further object is to provide a process for preparing such copolymers and yarns. Other objects will become apparent hereinafter.

In accordance with my invention, I prepare copolymers of acrylonitrile and 2-methallyl alcohol by polymerizing a mixture of monomeric acrylonitrile and monomeric 2-methallyl alcohol. The polymerization is advantageously carried out in the presence of a polymerization catalyst, e. g. a peroxide polymerization catalyst. Peroxide polymerization catalysts which are soluble in the mixture of the monomers can be employed, e. g. organic peroxides, for instance benzoyl peroxide, acetyl peroxide, lauroyl peroxide, tertiary butyl hydroperoxide, etc. Water soluble peroxides can also be used, e. g. hydrogen peroxide, ammonium persulfate, potassium persulfate, sodium persulfate, persulfuric acid, the water-soluble salts of percarbonic acid, the water-soluble salts of perphosphoric acid, the water-soluble salts of sulfo-per-acid (Caro's acid). As water-soluble salts, the ammonium, potassium and sodium salts are especially suitable. Mixtures of the catalysts can be employed.

The polymerizations can be carried out in bulk (mass), in solvents or in heterogenous dispersion where the mixture of monomers is dispersed in a non-solvent for the monomers, the particles of dispersed monomers being very small (emulsion) or relatively large (bead or granular). In bulk or mass polymerization, the organic peroxide catalysts are advantageously employed. In solvent polymerization, the organic peroxide catalysts are also advantageously employed. Suitable solvents include acetone, methyl ethyl ketone, methyl alcohol, ethyl alcohol, n-propyl alcohol, isopropyl alcohol, tertiary butyl alcohol, 1,4-dioxane, chloroform, carbon tetrachloride, naphtha (liquid saturated aliphatic hydrocarbons boiling from 60 to 100° C.), benzene, etc. Mixtures of solvents can be employed.

For emulsion polymerization, any non-solvent for the mixture of monomers can be employed, water being especially advantageous. The mixture of monomers can be advantageously emulsified in the water, using emulsifying agents, such as salts of higher fatty acids, e. g. sodium or potassium stearate, palmitate, etc. or ordinary soaps, salts of higher fatty alcohol sulfates, e. g. sodium or potassium cetyl sulfate, sodium or potassium lauryl sulfate, sodium or potassium oleyl alcohol, sodium or potassium stearyl alcohol, etc., salts of aromatic sulfonic acids, e. g. the sodium or potassium salts of alkylnaphthene sulfonic acids etc., higher molecular weight quarternary ammonium salts, e. g. dimethylbenzylphenylammonium chloride, quarternary ammonium salts containing the radicals $C_{15}H_{31}$ and $C_{17}H_{35}$, etc. Mixtures of emulsifying agents can be employed.

For bead or granular polymerization relatively poor dispersing agents, such as starch, methylated starch, gum arabic, gum acacia, polyvinyl alcohol, partly hydrolyzed polyvinyl acetate, gelatin, sodium cellulose glycolate, etc. can be employed. Mixtures of dispersing agents can be empolyed.

In the polymerizations wherein the mixture of monomers is dispersed in a non-solvent, the dispersion of the mixture of monomers can be facilitated by stirring, shaking or tumbling the mixture of monomers and non-solvent. In emulsion polymerization the water-soluble polymerization catalysts are advantageously employed. Heat accelerates all the polymerizations.

The mixture of monomeric acrylonitrile and 2-methallyl alcohol advantageously contains from 2 to 40% by weight of 2-methallyl alcohol, the remainder of the monomeric polymerizable compound being acrylonitrile. The most useful copolymers are obtained from mixtures of acrylonitrile and 2-methallyl alcohol containing from 10 to 40% by weight of 2-methallyl alchol. Those mixtures containing from 15 to 30% by weight of 2-methallyl alcohol give copolymers which are especially useful for preparing yarn. The proportion of 2-methallyl alcohol employed in the monomeric mixture has been found to be substantially the same in the polymeric material made from such a mixture in accordance with my invention.

The following examples will serve to illustrate further the manner of obtaining my new copolymers.

*Example 1*

15 g. of acrylonitrile, 3 g. of 2-methallyl alcohol and 0.01 g. of benzoyl peroxide were mixed together and the resulting solution allowed to stand for 48 hours at 50° C. A hard, translucent copolymer formed. This copolymer was soluble in acetonitrile containing from 5 to 10 per cent by weight of water. The copolymer softened above 180° C. The monomeric mixture in this example contained 17% by weight of 2-methallyl alcohol, the remainder being acrylonitrile.

*Example 2*

30 g. of acrylonitrile, 10 g. of 2-methallyl alcohol, 0.8 g. of sulfonated mineral oil, 0.3 g. of potassium persulfate and 200 cc. of water were mixed together in a cylindrical container which was four-fifths filled with the mixture. The container was then tumbled end over end, at from 10 to 20 R. P. M., at 50–60° C. for 48 hours. At the end of this time the copolymer had formed in a stable emulsion which was coagulated by adding sodium sulfate thereto. The copolymer which settled out was filtered off and washed with water. A yield of 32 g. of white copolymer was obtained. The copolymer contained 78% by weight of acrylonitrile and 22% by weight of 2-methallyl alcohol combined in the copolymer. The copolymer was soluble in a mixture consisting of 90% by weight of acetone and 10% by weight of water and gave a clear smooth dope in the mixture. Fibers or films made from the copolymer and oriented by drafting 300% to 500% showed a softening point above 200° C. The monomeric mixture in this example contained 25% by weight of 2-methallyl alchol, the remainder being acrylonitrile.

*Example 3*

50 g. of acrylonitrile, 10 g. of 2-methallyl alcohol, 1 g. of polyethylene glycol mono-oleate, 0.2 g. of potassium persulate and 200 cc. of water were mixed together in a cylindrical container which was four-fifths filled with the mixture. The container was then tumbled end over end, at from 10 to 20 R. P. M., at 60° C., for 36 hours. At the end of this time the copolymer had formed in a stable emulsion which was coagulated by adding sodium sulfate thereto. The copolymer which settled out was filtered off and washed with water. A yield of 46 g. of copolymer was obtained. The copolymer contained 16% by weight of 2-methallyl alcohol and 84% by weight of acrylonitrile combined in the copolymer. The copolymer was soluble in a mixture consisting of 90% acetonitrile and 10% water. Films and fibers prepared from the copolymer showed a softening point above 230° C., after they had been oriented by drafting. The monomeric mixture in this example contained 17% by weight of 2-methallyl alcohol, the remainder being acrylonitrile.

*Example 4*

Using 54 g. of acrylonitrile and 6 g. of 2-methallyl alcohol in Example 3 instead of the 50 g. of acrylonitrile and 10 g. of 2-methallyl alchol, a copolymer containing 88 to 90% by weight of acrylonitrile was obtained. This was soluble in a mixture of 2 parts by weight of acetonitrile and 1 part of N,N-dimethylformamide. The monomeric mixture in this example contained 10% by weight of 2-methallyl alcohol, the remainder being acrylonitrile.

Proceeding as shown in the foregoing examples, other copolymers can be prepared, for example from monomeric mixtures containing 2% by weight of 2-methallyl alcohol, 5% by weight of 2-methallyl alcohol, 15% by weight of 2-methallyl alcohol, 20% by weight of 2-methallyl alcohol, 30% by weight of 2-methallyl alcohol, 35% by weight of 2-methallyl alcohol and 40% by weight of 2-methallyl alcohol, the remainder being acrylonitrile in each case.

The copolymers made from monomeric mixtures containing from 15 to 30% by weight of 2-methallyl alcohol are soluble in a mixture of 90% by weight of acetone and 10% water, or in a mixture of 90% by weight of acetonitrile and 10% of water. From dopes in these solvents, the copolymer can be extruded through a spinneret into a cabinet or cell where the solvent is evaporated to give monofilaments which can be spun to yarn. Such dopes can also be coated on a film-forming surface of metal or glass, the solvent evaporated by passage of warm air over the coated dope layer and the resulting film stripped from the film-forming surface. The copolymers made from monomeric mixtures of other compositions can be similarly spun and coated from appropriate solvents as shown in the foregoing examples, using higher temperatures to evaporate the solvent where necessary. Processes for both dry spinning and wet spinning the copolymers described in the instant application are set forth in my copending application Serial No. 16,624, filed of even date herewith.

What I claim as my invention and desire to be secured by Letters Patent of the United States is:

1. A copolymer of acrylonitrile and 2-methallyl alcohol, the copolymer containing from 15 to 30 percent by weight of the 2-methallyl alcohol, the remainder being acrylonitrile.

2. A copolymer of acrylonitrile and 2-methallyl alcohol, the copolymer containing 16% by weight of 2-methallyl alcohol, the remainder being acrylonitrile.

3. A copolymer of acrylonitrile and 2-methallyl alcohol, the copolymer containing 28% by weight of 2-methallyl alcohol, the remainder being acrylonitrile.

4. A copolymer of acrylonitrile and 2-methallyl alcohol, the copolymer containing 20% by weight of 2-methallyl alcohol, the remainder being acrylonitrile.

5. A process for preparing a copolymer of acrylonitrile and 2-methallyl alcohol comprising polymerizing, in the presence of peroxide polymerization catalyst, a mixture of acrylonitrile and 2-methallyl alcohol, the mixture containing from 15 to 30% by weight of 2-methallyl alcohol, the remainder being acrylonitrile.

6. A process for preparing a copolymer of acrylonitrile and 2-methallyl alcohol comprising polymerizing, in the presence of an alkali metal persulfate polymerization catalyst and water, a mixture of acrylonitrile and 2-methallyl alcohol, the mixture containing from 15 to 30% by weight of 2-methallyl alcohol, the remainder being acrylonitrile.

7. A process for preparing a copolymer of acrylonitrile and 2-methallyl alcohol comprising polymerizing in the presence of an organic peroxide polymerization catalyst, a mixture of acrylonitrile and 2-methallyl alcohol, the mixture containing from 15 to 30% by weight of 2-methallyl alcohol, the remainder being acrylonitrile.

8. A process for preparing a copolymer of acrylonitrile and 2-methallyl alcohol comprising polymerizing, in the presence of benzoyl peroxide, a mixture of 2-methallyl alcohol and acrylonitrile, the mixture containing 17% by weight of 2-methallyl alcohol, the remainder being acrylonitrile.

9. A process for preparing a copolymer of acrylonitrile and 2-methallyl alcohol comprising polymerizing, in the presence of potassium persulfate and water, a mixture of 2-methallyl alcohol and acrylonitrile, the mixture containing 25% by weight of 2-methallyl alcohol, the remainder being acrylonitrile.

10. A process for preparing a copolymer of acrylonitrile and 2-methallyl alcohol comprising polymerizing, in the presence of potassium persulfate and water, a mixture of 2-methallyl alcohol and acrylonitrile, the mixture containing 17% by weight of 2-methallyl alcohol, the remainder being acrylonitrile.

JOHN R. CALDWELL.

REFERENCES CITED

The following references are of record in the file of this patent:

FOREIGN PATENTS

| Number | Country | Date |
|---|---|---|
| 883,551 | France | Mar. 29, 1943 |

Disclaimer 2,525,521.—*John R. Caldwell*, Kingsport, Tenn. COPOLYMERS OF ACRYLONITRILE AND 2-METHALLYL ALCOHOL. Patent dated Oct. 10, 1950. Disclaimer filed Jan. 31, 1952, by the assignee, *Eastman Kodak Company*.

Hereby enters this disclaimer to claims 1, 5, and 7 of said patent without in any way modifying the scope, or affecting the validity of the remaining claims.

[*Official Gazette March 11, 1952.*]